United States Patent [19]

Watson, Jr. et al.

[11] 4,226,969
[45] Oct. 7, 1980

[54] EPOXY COMPOSITION FOR THREADLOCKING

[75] Inventors: Charles R. Watson, Jr., Farmington; Mary A. Eichner, Windsor, both of Conn.

[73] Assignee: Allied Products Corporation, Avon, Conn.

[21] Appl. No.: 10,214

[22] Filed: Feb. 8, 1979

[51] Int. Cl.² .................... C08G 59/50; C08G 59/64
[52] U.S. Cl. ................................. 528/93; 528/104; 528/111; 528/407; 525/507; 156/330
[58] Field of Search ............... 528/93, 104, 111, 407, 528/135; 525/507

[56] References Cited

U.S. PATENT DOCUMENTS

| | | | |
|---|---|---|---|
| 2,907,748 | 10/1959 | Lieb | 260/47 |
| 3,059,697 | 10/1962 | Pitts | 166/49 |

FOREIGN PATENT DOCUMENTS 665074 6/1963 Canada.

OTHER PUBLICATIONS

Bruins, "Epoxy Resin Technology," Interscience, 1968, New York, pp. 74, 75, 115, 116, & 117.

Primary Examiner—Earl A. Nielsen

[57] ABSTRACT

A threadlocking composition for mating threaded fasteners utilizes an epoxy resin system with a component adapted to effect dispersion of lubricants or other organic films on the mating threaded surfaces to thereby improve the threadlocking capabilities thereof without requiring pretreatment. The threadlocking composition comprises an epoxy resin, an amine hardener therefor and 1-25 percent of an aminoalcohol compound which is soluble in the resin/hardener system and wherein the amine and hydroxyl groups are disposed on a carbon chain and on different carbon atoms of that chain. In using the composition, it is placed upon the threads of at least one of the cooperating members which are then assembled and allowed to remain so assembled to produce curing of the epoxy composition. Pretreatment of the fastener surfaces is not required. At the end of three hours, this results in an increase in the torque required for disassembly to a level equal to at least 75 percent of the torque required for assembly. However, the epoxy composition remains substantially free from bonding to the threaded members so as to permit the disassembly when required. Further increases in disassembly torque result from further curing.

7 Claims, No Drawings

EPOXY COMPOSITION FOR THREADLOCKING

BACKGROUND OF THE INVENTION

Over the past two decades, there has been substantial activity in the development of various resin systems to lock mating threaded fasteners together against premature and unwanted disassembly, as might be produced by vibration, impacts and the like. Although adhesives have been proposed for this purposes, the preferred resin systems are those which do not bond to the mating surfaces of the fastener members but which fill the spacing therebetween so as to produce signficant resistance to relative rotation and thereby disassembly.

Among the threadlocking compositions which are widely employed are the anaerobically curing acrylate resin materials of the type shown in Krieble U.S. Pat. Nos. 3,043,820 and 3,046,262. As is well known, such acrylate systems may require pretreatment of certain metal surfaces in order the achieve the desired result to avoid inhibition of the polymerization reaction; however, they do afford significant advantages in that curing will normally not commence until the composition has been removed from contact with air, thus providing extended pot life and/or working time.

Various curable resin systems have been suggested for threadlocking purposes as, for example, in Anthony U.S. Pat. No. 3,061,455; Schultz et al U.S. Pat. No. 3,179,143; Adams et al U.S. Pat. No. 3,396,116 and Deckert et al U.S. Pat. Nos. 3,642,937 and 3,746,068. The Schultz et al and the Deckert et al Patents are indicative of the efforts in the art to encapsulate the resin system components to extend their pot life and facilitate their use; the Anthony Patent provides reactive components on the opposed surfaces which mix upon assembly.

Epoxy resins offer significant economic advantages over the anaerobically curing acrylic systems because of their inherently lower cost, but problems have remained in that pretreatment of the fastener surfaces has frequently been required to achieve desired levels of torque to resist inadvertent disassembly. Moreover, some epoxy systems which would cure sufficiently rapidly to meet industrial needs have frequently suffered too short a pot life to permit practical use in many applications. Alternatively, relatively expensive apparatus has been developed for admixing the components of the epoxy system immediately prior to application.

As is well known, many fasteners used in industrial application retain on the surfaces thereof of film of organic material, most generally a lubricant used during the course of manufacture. It is known that such organic films decrease the effectiveness of the threadlocking compositions; it is believed that the organic material may inhibit proper polymerization. Heretofore, it has been considered necessary to pretreat the fasteners so as to remove all or substantially all of the interfering organic film prior to the assembly operation. Such operations obviously involve added costs and time. Exemplary of the prior art in this regard are Epstein et al U.S. Pat. No. 3,737,355 and Dobinson et al U.S. Pat. No. 3,746,685.

It is an object of the present invention to provide a novel epoxy threadlocking composition which may be used upon threaded fasteners without the necessity for pretreating such fasteners and which is rapidly curing to provide a desirable torque level for disassembly.

It is also an object to provide such an epoxy threadlocking composition which is relatively economical, relatively simple to compound and relatively trouble-free in use.

SUMMARY OF THE INVENTION

It has now been found that the foregoing and related objects may be readily attained in an epoxy resin threadlocking composition containing 30–50 percent by weight of an epoxy resin, 30–70 percent by weight of an amine hardener therefor, and 1–25 percent by weight of an aminoalcohol compound soluble in the resin/hardener system. The amine and hydroxy groups of the aminoalcohol compound are disposed on a carbon chain and on different carbon atoms of that chain. In addition, the composition may contain up to 25 percent by weight of a polyfunctional amine accelerator and up to 10 percent by weight of an inert filler.

In accordance with the preferred aspects of the invention, the aminoalcohol compound is an aliphatic compound and is present in the amount of 2–15 percent by weight of the composition. The epoxy resin comprises 35–55 percent, the hardener comprises 40–55 percent, and the accelerator comprises 2–15 percent, of the composition.

In the method of threadlocking of the present invention, an effective amount of the epoxy resin threadlocking composition is placed on the threads of at least one of a pair of cooperatively threaded fastener members to be assembled and without pretreatment of the fastener members. The members are then assembled with the threadlocking composition being disposed between the mating threaded surfaces thereof, and the assembled fastener members are allowed to remain so assembled for a period of three hours to produce curing of the epoxy composition and to achieve an increase in the torque required to disassemble the fastener members. At this point, the torque is equal to at least 75 percent of the torque initially required to assemble the threaded fastener members and the cured epoxy composition remains substantially free from bonding to the threaded fastener members.

In general practice, the untreated threaded surfaces of the fastener members will have a film of organic material such as a lubricant thereon and, upon application of the threadlocking composition and assembly of the fastener members, the film of organic material will be substantially dispersed within the epoxy resin composition so as to facilitate cohesion or locking without producing substantial adhesion of the mating surfaces.

DETAILED DESCRIPTION OF THE PREFERRED EMBODIMENTS

As indicated hereinbefore, the threadlocking compositions of the present invention comprise an epoxy resin, an amine hardener therefor and an amino-alcohol compound soluble in the resin/hardener system. Preferably, they additionally contain a polyfunctional amine accelerator and they may optionally contain minor amounts of an inert filler.

The epoxy resin compound may be any monomeric or polymeric material containing at least one functional epoxy group. Generally, epoxy compounds most widely used result from the reaction of bisphenol-A (4,4'-isopropylidenediphenol) with epichlorohydrin or from the reaction of epichlorohydrin with a phenol-formaldehyde resin of relatively low molecular weight.

The preferred epoxy resins are the reaction products of bisphenol-A and epichlorohydrin.

Although not essential and not generally desirable, the epoxy resin compound may additionally contain reactive diluents such as those produced by reaction of an alcohol and epichlorohydrin, phenols such as nonyl phenol, or nonreactive types such as dibutylphthalate.

The second essential component of the composition is the amine hardener and various classes of amine hardners may be employed including modified and unmodified aliphatic and aromatic polyamines, alicyclic polyamines, and amidopolyamines. The amine hardener may be the product of reaction of an amine with an epoxy resin so long as there are present in the resultant compound a multiplicity of reactive primary amine groups.

The aminoalcohols which comprise an essential part of the composition must be soluble in the resin/hardener system and must have at least one reactive hydroxyl group and one reactive amine group, with these two groups being disposed on different carbon atoms of the carbon chain. The carbon chain itself can be a substituent on an aromatic, carbocyclic or heterocyclic ring. Exemplary of the aminoalcohol compounds which have been found useful in the present invention are 2-dimethylaminoethanol; ethanolamine; 3-dimethylamino 1-propanol; 2-dimethylamino 2-methyl 1-propanol; and dibenzylethanolamine. The preferred aminoalcohol is 2-dimethylaminoethanol.

As indicated previously, the ratio of resin to hardener in the system may vary, with the preferred formulations having about 40-60 percent by weight of the resin and most desirably about 45-55 percent resin. Conveniently, the hardener, the aminoalcohol and the accelerator are combined to provide a hardener component which may then be admixed in a one-to-one ratio with the epoxy resin to faclitate handling and avoid errors in formulation. Moreover, this facilitates use of automatic mixing and dispensing devices in assembly operations. The aminoalcohol is effective in amounts of 1-25 percent by weight of the total composition but is preferably employed in the range of 2-15 percent and most desirably at about 8-12 percent by weight.

Although not essential, polyfunctional amine accelerators are desirably included in an amount up to 25 percent by weight of the total compositon in order to accelerate the curing of the composition. Generally, such amine accelerators will fall within the category of polyfunctional tertiary amines such as di- and tri-(dimethylaminomethyl)phenols, diethylenetriamine, triethylenetriamine, triethylenediamine, ethylenediamine, and triethylenetetramine. Of the above compounds, tri-(dimethylaminomethyl)phenol has proven particularly advantageous in amounts of about 5-15 percent by weight of the composition.

For some applications, it may be desirable to include a filler such as alumina, silica and kaolin. Generally, however, such fillers are deleterious to the desired properties but do provide the functions of increasing bulk and reducing costs. Where used, such fillers should not exceed 10 percent by weight of the total composition and preferably should comprise 5 percent or less.

The compositions of the present invention are operable at temperatures as low as about 10° C. but are preferably used at ambient temperatures since the initial rate of curing of the reaction is temperature-dependent. As is well known, the curing reaction is exothermic so that excessive temperatures should be avoided to minimize the possibilities for overly rapid curing and/or combustion.

It has been found that the compositions of the present invention enjoy a pot life at ambient temperature of at least five minutes (as determined for 10 gram samples), and the preferred compositions enjoy pot lives of ten minutes or more. This has proven particularly beneficial from the standpoint of permitting batch formulation and ease of application.

The amount of threadlocking composition applied to the cooperating surfaces of the fasteners will vary depending upon the size of the fasteners and the amount of resistance to disassembly torque required. For most fasteners in the range of up to ½ inch diameter, 0.1-1.0 cc. of the resin composition will be sufficient to generate a disassembly torque value equal to at least about the assembly torque after curing for periods of 24 hours. Obviously, greater amounts may be employed where the size of the fastener warrants. In practice, 0.2-0.4 cc. has been found adequate and is preferable for fastenerss in the size range indicated above.

The theory of operation of the aminoalcohol in the epoxy composition is not fully understood. It is believed that the lubricant or other organic film on the surface of the fastener inhibits or modifies the resin formulation so that the cured resin is relatively soft, whereas the ideal threadlocking compositions are relatively rigid and brittle. It is believed that the aminoalcohols in the composition of the present invention serve to disperse the lubricant or organic material into the resin formulation in a manner sufficient to minimize the adverse effects heretofore experienced. In any event, it has been noted that the composition of the present invention will cure relatively rapidly to a rigid, brittle filler between the two surfaces to provide the desired frictional resistance to disassembly. However, because of the brittleness, the resin will crumble upon application of sufficient force, so as to permit disassembly.

As has previously been indicated, the resin compositions of the present invention exhibit little, if any, adhesion to the fastener surfaces, i.e., the shear strength of any adhesive bond is less than 50 psi. It is believed that this absence of adhesive bond results from the shrinkage and/or brittleness of the cured resin composition.

The viscosity of the epoxy threadlocking compositions of the present invention may vary from as little as 200 to as much as 50,000 centipoises at 25° C. The preferred formulations have a viscosity within the range of 5,000-20,000 centipoises.

The following is a preferred composition of the present invention:

| Component | Parts by Weight |
|---|---|
| Epoxy Resin (Diglycidylether of Bisphenol-A) (sold by Ciba-Geigy under the trademark ARALDITE 6010) | 50 |
| Modified Amine Hardener (sold by Ciba-Geigy under the trademark HY 9517) (believed to be reactive product of an epoxy resin with an amine providing numerous primary amino groups) | 40 |
| Aminoalcohol (2-dimethylaminoethanol) | 5 |
| Polyfunctional Tertiary Amine Accelerator (Tri-(dimethylaminomethyl)phenol) | 5 |

Exemplary of the efficacy of the present invention are the following specific examples wherein all parts are parts by weight unless otherwise indicated.

EXAMPLE ONE

An epoxy threadlocking composition was prepared in accordance with the formula set forth immediately above. Approximately 0.25 cc. of the composition was applied to the surface of a No. 16, Grade 2 steel bolt ⅜ inch in length which was then assembled with a cooperating nut. Both fastener members were utilized in the "as received" condition with an apparent film of lubricant upon the threaded surfaces. An assembly torque of 240 inch pounds was utilized.

After three hours curing at ambient temperature, the torque required to effect disassembly was 115 percent of the assembly torque, or 176 inch pounds. After curing for 24 hours, the torque required for disassembly was 130 percent of the assembly torque, or 312 inch pounds. Upon disassembly, the threadlocking composition was found to comprise a powdery deposit within the threads of the fastener members.

Adhesive shear strength tests between lapped aluminum plates etched with dichromate using a ½ inch overlap and a 24-hour period of cure at room temperature demonstrated a shear strength of less than 50 psi.

EXAMPLE TWO

An epoxy threadlocking composition similar to that in Example One was prepared substituting ethanolamine for the dimethylaminoethanol. A similar test procedure was followed. At the end of three hours, the torque required to effect dissassembly was 97 percent of the assembly torque; and at the end of 24 hours curing, the disassembly torque reached the level of 100 percent or 240 inch pounds.

EXAMPLE THREE

To establish the advantage of incorporating the accelerator, a composition essentially the same as that in Example One was prepared, but omitting the accelerator. Following the same procedure, the disassembly torque at the end of three hours was 89 percent of the assembly torque; and at the end of 24 hours the disassembly torque was 98 percent of the assembly torque.

From the foregoing detailed specification and examples, it can be seen that the threadlocking compositions of the present invention afford significant advantages from the standpoint of ease of handling, reasonable pot life and good threadlocking properties. They are relatively economical to formulate and may be formulated as two-component systems to be admixed shortly before use in an expedient and relatively throuble-free fashion. The methods utilizing the threadlocking compositions are simple, effective and relatively foolproof.

Having thus described the invention, we claim:

1. An epoxy resin threadlocking composition consisting essentially of:
   A. 30–70 percent by weight of an epoxy resin;
   B. 30–70 percent by weight of an amine hardener component therefor;
   C. up to 25 percent by weight of a polyfunctional amine accelerator therefor;
   D. up to 10 percent by weight of an inert filler; and
   E. 1–25 percent by weight of an aminoalcohol compound soluble in the resin/hardener system and wherein the amine and hydroxyl groups are dispersed on a carbon chain and on different carbon atoms of that chain.

2. The threadlocking composition of claim 1 wherein said aminoalcohol compound is an aliphatic compound.

3. The threadlocking composition of claim 2 wherein said aminoalcohol compound is 2-dimethylaminoethanol.

4. The threadlocking composition of claim 1 wherein said epoxy resin comprises 40–55 percent, said hardener component comprises 35–55 percent, said accelerator comprises 2–15 percent, and said aminoalcohol comprises 2–15 percent, all by weight of said threadlocking composition.

5. The threadlocking composition of claim 1 wherein said polyfunctional amine accelerator includes at least two tertiary amine groups.

6. The threadlocking composition of claim 5 wherein said polyfunctional amine accelerator is a (dialkyl aminomethyl)phenol.

7. The threadlocking composition of claim 1 wherein a volume of 10 grams of said composition has a pot life of at least 5 minutes at ambient temperature and, upon curing, has an adhesive shear strength of less than 50 psi.

* * * * *

UNITED STATES PATENT AND TRADEMARK OFFICE
CERTIFICATE OF CORRECTION

PATENT NO. : 4,226,969
DATED : October 7, 1980
INVENTOR(S) : Charles R. Watson, Jr. et al It is certified that error appears in the above-identified patent and that said Letters Patent are hereby corrected as shown below:

Column 6, lines 22-23, "dispersed" should be -- disposed --

Signed and Sealed this

Twenty-third Day of December 1980

[SEAL]

Attest:

Attesting Officer

SIDNEY A. DIAMOND

Commissioner of Patents and Trademarks